(12) United States Patent
Babini

(10) Patent No.: US 6,655,014 B1
(45) Date of Patent: Dec. 2, 2003

(54) DEVICE FOR INSERTING WIRES AND/OR PIPES IN A TUBULAR, FLEXIBLE SHEATH PROVIDED WITH OPENABLE OVERLAPPING EDGES

(75) Inventor: Ezio Babini, Zola Predosa (IT)

(73) Assignee: Richco Italia S.r.l., Bologna (IT)

( * ) Notice: Subject to any disclaimer, the term of this patent is extended or adjusted under 35 U.S.C. 154(b) by 0 days.

(21) Appl. No.: 09/913,616
(22) PCT Filed: Feb. 24, 2000
(86) PCT No.: PCT/IB00/00203
§ 371 (c)(1), (2), (4) Date: Nov. 6, 2001
(87) PCT Pub. No.: WO00/52800
PCT Pub. Date: Sep. 8, 2000

(30) Foreign Application Priority Data

Mar. 2, 1999 (EP) .............................................. 99104172

(51) Int. Cl.[7] .............................. B23P 19/00; H02G 3/04
(52) U.S. Cl. .............................. 29/755; 29/758; 29/760; 174/68.3
(58) Field of Search .......................... 29/755, 758, 760; 285/24, 226; 248/73, 68.1; 174/68.3

(56) References Cited

U.S. PATENT DOCUMENTS 5,876,069 A * 3/1999 Kobayashi ................... 285/24
6,034,329 A * 3/2000 Kawamura ................... 174/102
6,317,968 B1 * 11/2001 Kawamura ................... 29/755

FOREIGN PATENT DOCUMENTS

| FR | 2 761 826 | 10/1998 |
| JP | 57042007 | 3/1982 |
| JP | 07032273 | 2/1995 |
| JP | 07107636 | 4/1995 |

* cited by examiner

Primary Examiner—Carl J. Arbes
Assistant Examiner—Tim Phan
(74) Attorney, Agent, or Firm—William J. Sapone; Coleman Sudol Sapone, P.C.

(57) ABSTRACT

A device for inserting wires and/or pipes in a tubular, flexible sheath includes a sleeve (11), with a split (111) made therealong. The sleeve (11) is encircled by a cylindrical tubular body (21) also having made therealong a relative split (211). The sleeve (11) can turn inside this cylindrical tubular body (21), so as to define two working positions, first (H1) and second (H2). In the first working position (H1), the split (111) of the sleeve (11) corresponds to the split (211) of the tubular body (21), so that the wires can be inserted into the device. In the second working position (H2), the split (211) of the tubular body (21) is closed by the sleeve (11), so as to block the wires inside the device. A rounded, wedge-shaped member (23) rising over the cylindrical tubular body (21) is to be slidably fitted in the flexible sheath (F). The profile of the member (23) allows to open the edges of the elements (3) of the sheath, so as to insert the wires thereinside.

5 Claims, 5 Drawing Sheets

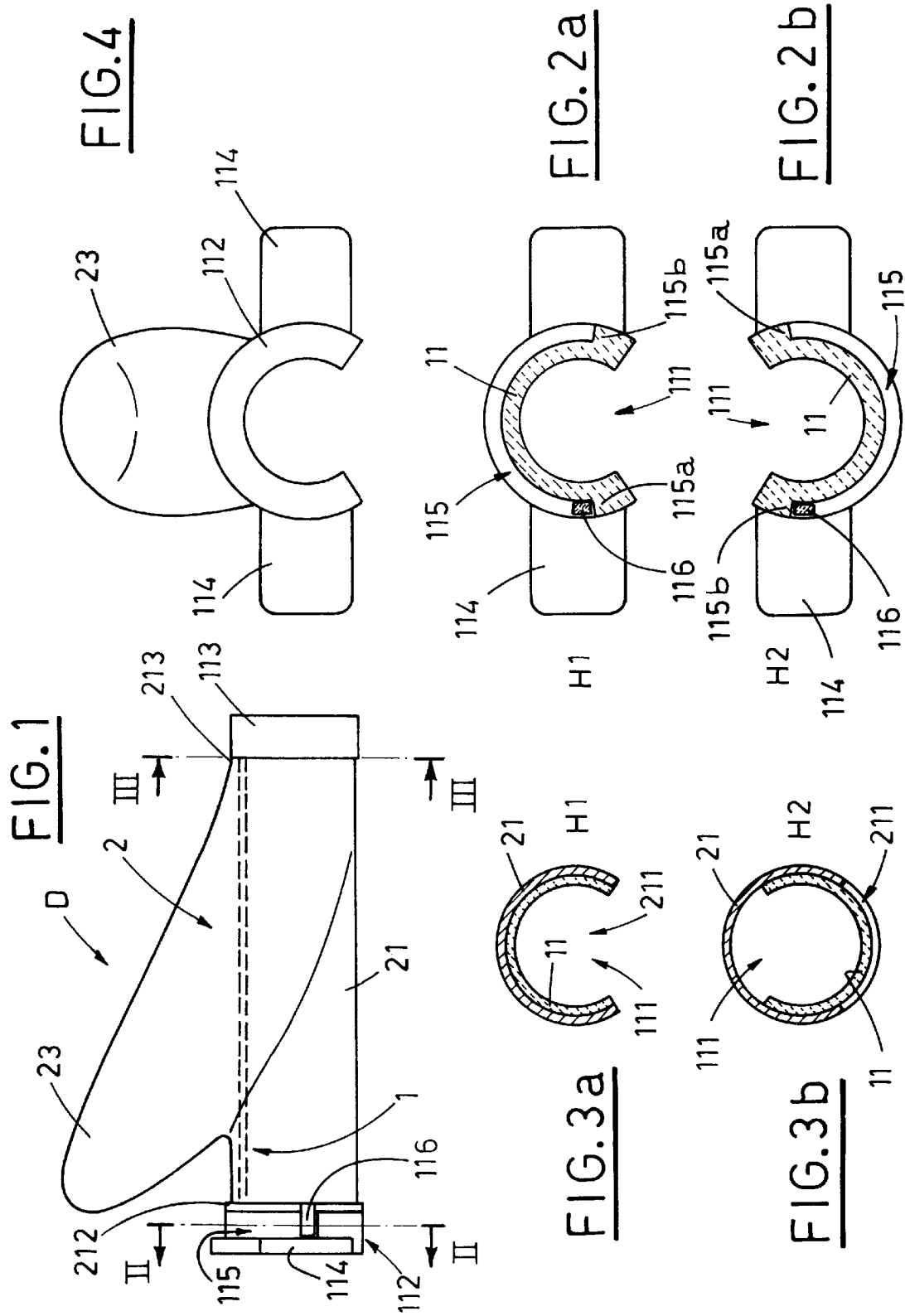

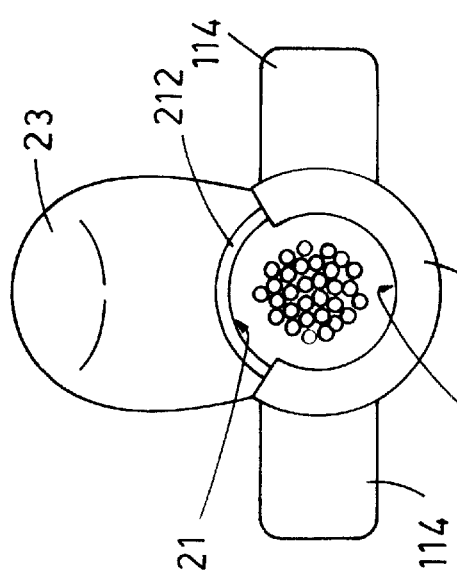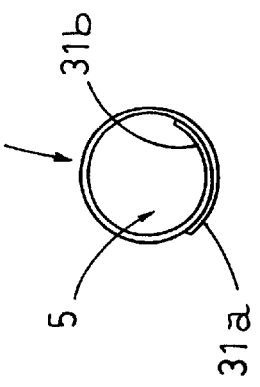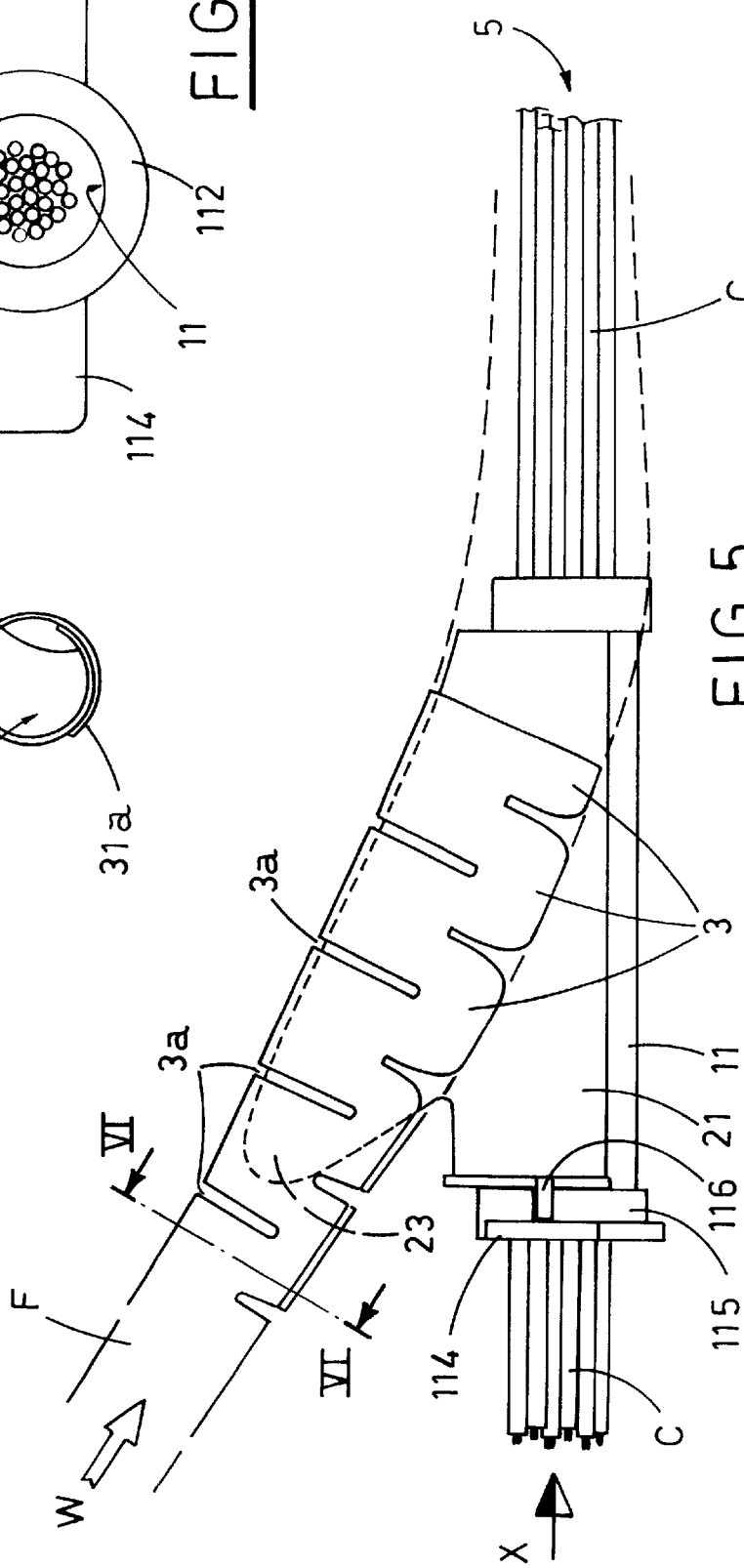

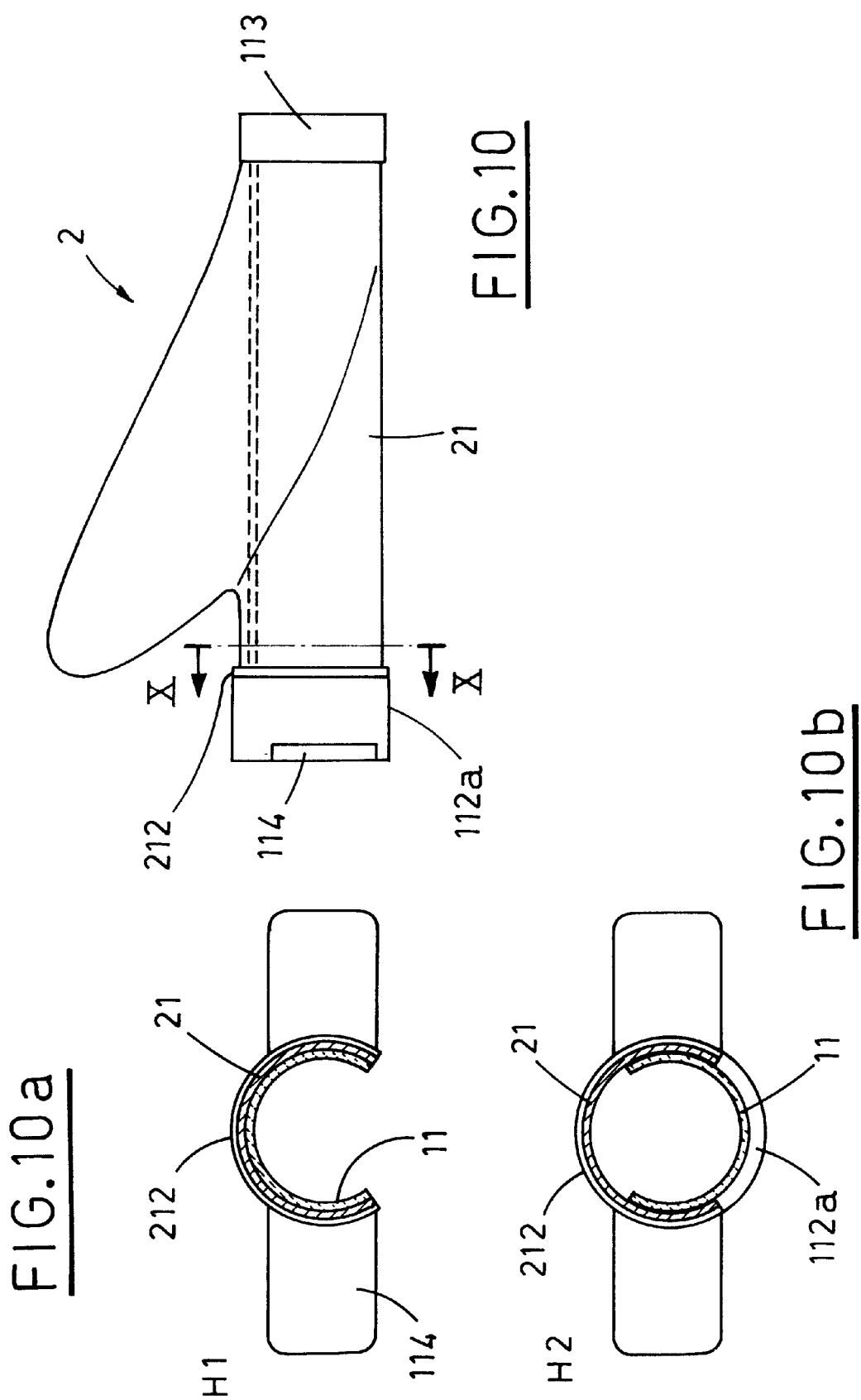

DEVICE FOR INSERTING WIRES AND/OR PIPES IN A TUBULAR, FLEXIBLE SHEATH PROVIDED WITH OPENABLE OVERLAPPING EDGES

BACKGROUND OF THE INVENTION

The present invention relates to the technical field concerned with providing a protection for a bundle of pipes, such as pipes for compressed air or refrigerating liquids, wires and/or leads.

These elements, may be for, instance electric wires installed on control units of automatic machines, wirings of automobiles or motor vehicles, or cables used to supply power to computers or to data transmission lines, optical fibres, or they may also be the leads used in telephonic lines.

More particularly, the present invention concerns a device for inserting wires and/or pipes in a tubular, flexible sheath with edges, that can be parted.

DESCRIPTION OF THE PRIOR ART

In these last years, the continuously growing use of electronics as a control and operating means has determined a relevant increase of the number of electric wires and leads present on an automatic machine, a control unit, or a motor vehicle, etc.

This has implied the increasing need set up more functional wiring and to distribute wires along predetermined protected and safe paths, so as to avoid their possible damages, useless encumbrance or obstacles to normal working of motors or moving mechanical means controlled thereby.

Therefore, during installation of wires and leads, it is fundamental to first tape them and insert them in protective and insulating structures, such as tubular sheaths or raceways.

Moreover, protection and insulation of all wires, leads and/or pipes from the surrounding environment is explicitly required by many security rules currently in force.

At present, the taping can be made by an operator, who spreads and set together the single cables, arranging them parallel one beside another, so as to avoid possible tangling.

After the taping has been completed, the operator inserts the group of cables thus obtained into the above mentioned protection structure.

The operator can use particular tools, such as clamps or cable terminals, which facilitate the insertion and sliding of the group of wires inside the protection structure.

Because of the wires length or due to the particular, flexible and not straight form of protection structures, inserting operation of the taped group of wires results to be extremely difficult.

Thus, this operation requires a lot of manpower and prolongs the working time, resulting in a considerable increase of total installation cost.

A Japanese document No. 7-32273 describes a device which inserts taped groups of cables in a tubular flexible sheath having edges that can be parted away, and the operation can be performed in a short time. This device includes two mirror-like portions, hinged to one each other and maintained close to each other by a spring.

Each of these portions includes a semi-tubular, longitudinal straight element, having semi-circular section, which is connected to a half-shell, hollow inside and with one end truncated. The half-shell is connected with a corresponding outer part of the semi-tubular element. The half-shell merges with the semi-tubular element according to a direction inclined with reference to the longitudinal axis of the semi-tubular element. The back parts of the element and shell match with each other in a way such that the axial dimension of the semi-tubular element is not reduced and its cross-section is maintained unchanged.

The two mirror-like portions are maintained close to each other due to the elastic action of the spring, so that the semi-tubular element of one portion, together with the corresponding semi-tubular element of the other portion, create a cylindrical channel.

The group of wires is to be inserted in this cylindrical channel.

Moreover, the half-shell of one portion, together with the corresponding half-shell of, the other portion, define an ogive-like structure, which, is to be slidably fitted into the flexible sheath.

This ogive-like structure allows to open the edges of the flexible sheath along the split, and make the sheath slide along the path defined by the two connected half-shells toward the portion mating with the semi-tubular elements, i.e. toward the outer surface of the adjacent cylindrical channel.

When the edges of the sheath are beyond the back end of the cylindrical channel, they close thus swallowing the group of wires.

The lower part of each mirror-like portion includes grasping means, formed by a wing, which is handled by the operator to define two working positions of the device.

In a first position, the wings are close to each other and the two mirror-like portions are open due to the elastic action of the spring, so that the wires can be inserted in the device, i.e. inside the cylindrical channel defined by the two joined semi-tubular elements.

In a second position, the wings are released and consequently, the two mirror-like portions abut against each other due to the elastic action of the spring, so that the group of wires can be closed inside the device.

At this point, the wires can be inserted in the flexible sheath by making this sheath slide about and along the ogive structure, which opens the sheath edges.

When they are beyond the end of the device, the opened sheath edges swallow the group of wires by closing one over another.

The above mentioned grasping means can be formed, as described in the Japanese document No. 7-107636, by pliers, which act against the elastic action of the spring, so as to open the two mirror-like portions and define the two working positions of the device.

The publication PR-B-2761826 describes a tool for inserting bundled conductors in split over-sheath. The tool has pointed head, with integral handgrip, separating the sheath edges and guiding conductors in through smooth channels In better detail, the tool has a pointed flattened head provided at approximately 90 degrees to the head-grip. This is designed to enter a split over-sheath, which is e.g. textile-based, with one edge overlapping the other. After separation, the edges locate in grooves running along either side of the head. The conductor bundle enters, sideways, a channel passing through the head at about 20 degrees to the sheath axis, its surface coated to reduce friction. A second channel, approximately parallel to the hand-grip, crosses the first; this allows one or more conductors to be abstracted, or further conductors to be added, at any position.

The devices of this type are ready to use and obtained by simple solutions, however, their production is considerably complicated and expensive.

Moreover, due to the repeated openings of the mirror-like portions, they can be displaced and not aligned, which can result in hinges damage or spring wearing.

SUMMARY OF THE INVENTION

The object of the invention is that of providing a device which allows to insert a group of wires or cables in a tubular flexible sheath by simple and immediate operations.

Another object of the present invention is to propose a device for inserting wires or cables in a tubular flexible sheath, obtained by a compact, strong and extremely practical structure.

A further object of the present invention is to propose a device for inserting wires or cables in a tubular flexible sheath, obtained by a simple technical solution, and which is extremely reliable and cheap.

The above mentioned objects are obtained, in accordance with the contents of claims, by means of a device for inserting wires, cables, pipes in a flexible sheath, said flexible sheath including a plurality of elements, with a slit made on each said elements having two edges overlap one another in normal condition, so as to define a channel, said device including:

a cylindrical tubular body having a front end, a rear end, an upper part and lower part with a longitudinally extending split, and with a rounded, wedge-shaped member merging therewith in said upper part of said cylindrical tubular body and extending in a substantially inclined direction, with reference to the longitudinal axis of said cylindrical tubular body and convergent toward said rear end;

a sleeve having circular cross section corresponding to the cross section of said cylindrical tubular body, so that said sleeve can be fitted in the cylindrical tubular body, said sleeve being delimited by two heads, a first head and a second head respectively, with of the sleeve having a longitudinal extension such that said two heads, first and second respectively go in abutment on inner part of enlarged borders made at a front end and at a rear end of said cylindrical tubular body, so as to prevent any longitudinal translation of said sleeve with respect to said cylindrical tubular body, with a split being made along the sleeve and having dimensions equal to the split of the cylindrical tubular body, so that the sleeve can turn inside the cylindrical tubular body between two working positions, first in which the split of the sleeve matches with the split of the tubular body, so that one end of a bundle of wires or cables can be inserted in the device, and second position, in which the split of the tubular body is closed by the sleeve, so as to lock the group of cables inside the device, with said tubular flexible sheath being made to slide, in direction, around and along said wedge-shaped member, whose profile allows to elastically deform by deflection, the elements of the sheath opening their edges for introducing said bundle of wires or cables into said tubular flexible sheath through the said end of said cylindrical tubular body.

BRIEF DESCRIPTION OF THE DRAWINGS

The characteristic features of the present invention will become more fully apparent from the following detailed description of preferred, but not only embodiments, taken in conjunction with the accompanying drawings, in which:

FIG. 1 is a schematic front view of the device for inserting wires and/or pipes in a tubular, flexible sheath with edges that can be parted away, made in accordance with a first embodiment;

FIGS. 2a and 2b are schematic section views, taken along line II—II of FIG. 1, of two working positions of the proposed device;

FIGS. 3a and 3b are schematic section views, taken along line III—III of FIG. 1, in particular, FIG. 3a of the working position of FIG. 2a and FIG. 3b of the working position of FIG. 2b;

FIG. 4 is a schematic lateral view of the device of FIG. 1;

FIG. 5 is a schematic lateral view of the device of FIG. 1 in a particular working step, in which the wires or cables are inserted in a tubular flexible sheath;

FIG. 6 is a schematic section view taken along line VI—VI of FIG. 5;

FIG. 7 is a schematic view of the proposed device according to the direction X indicated in FIG. 5;

FIG. 8 is a schematic section view taken along VIII—VIII of FIG. 1a;

FIG. 9 is a schematic section view taken along line IX—IX of FIG. 1b;

FIG. 10 is a schematic, front view of the proposed device for inserting wires and/or pipes in a tubular flexible sheath with edges that can be parted away, made in accordance with an interesting embodiment;

FIGS. 10a and 10b are schematic section views taken along line X—X of FIG. 10, showing respectively two working positions of the proposed device;

BEST MODES OF CARRYING OUT THE INVENTION

Figure 1A:
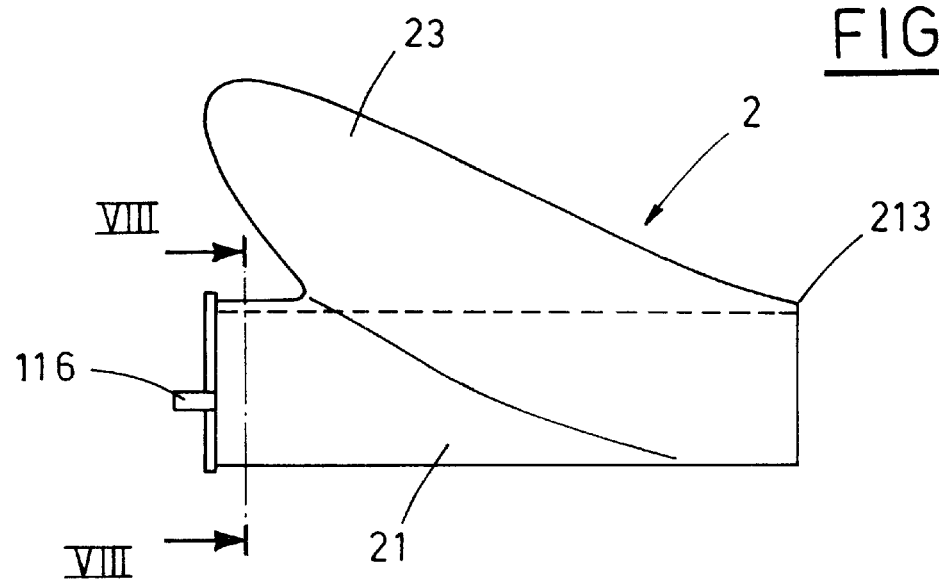
FIGS. 1a and 1b are schematic front views of the two significant elements of the device of FIG. 1.

With reference to the enclosed drawings, D generally designates a device for inserting wires or cables and/or pipes C in a tubular flexible sheath F.

This tubular flexible sheath F, of known type, is formed by a combination of a plurality of elements 3 made of plastic material, which can be elastically deformed and are connected one to another.

These elements 3 have each one a slit 3a made on its back.

This tubular flexible sheath F can be substituted by a pipe (not shown), whose inner walls are corrugated and which has longitudinal splits due to which it can be flexible and, at the same time, double insulated.

When the elements 3 are in a normal condition position, their edges 31a and 31b overlap each other, as shown in FIG. 6.

In this way, a channel 5 is defined inside the sheath F.

Moreover, when the elements 3 are slightly forced to deflect, their edges 31a and 31b are parted away until an aperture is formed in the channel 5, so that the wires or cables C can be inserted in the sheath F.

Due to the slits 3a of each element 3, the sheath F is extremely light and flexible and can fold up defining various paths of the channel 5.

According to a first embodiment shown in Figures from 1 to 9, the above mentioned device D for inserting cables C in the tubular flexible sheath; F includes a first member 1, which rotates inside a second member 2.

Figure 1B:
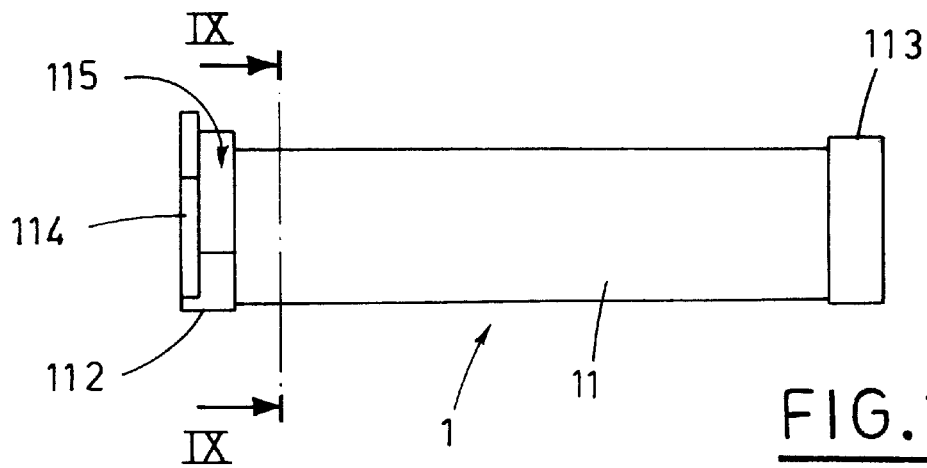

As shown in FIG. 1b, this first member 1 is formed by a tubular sleeve 11, whose cross section is circular and which is delimited by two heads, first head 112 and second head 113, respectively, situated at the ends of this sleeve 11.

Figures 8, 9:
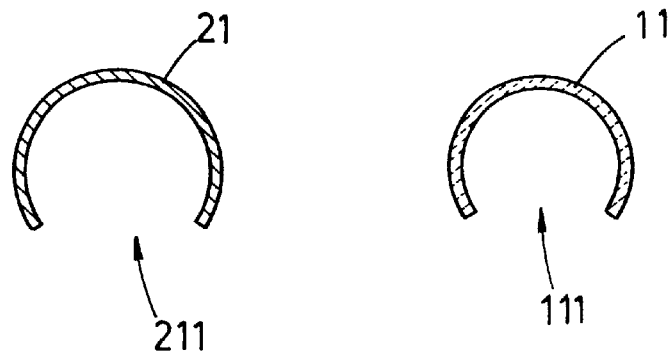

A split 111 extends along the sleeve 11, from the first head 112 to the second head 113 (FIG. 9). A group of wires or cables C can be introduced through this split 111.

The above mentioned second member, 2 is formed, as shown in FIG. 1a, by a tubular cylindrical body 21, which has, made therealong, a split 211 (FIG. 8), whose dimensions are comparable with the dimensions of the split 111 of the sleeve 11.

The cross section of the tubular cylindrical body 21 is circular and its dimensions allow the sleeve 11 to be fitted in the body 21.

The sleeve 11 is inserted into the tubular body 21 through the split 211 of the latter.

After the sleeve 11 has been fitted in the body 21, due to the longitudinal form of this sleeve 11, the enlarged border of the heads, first 112 and second 113 are located to cover the ends, namely front end 212 and rear end 213 respectively, of the tubular body 21.

Thus any longitudinal movement of the sleeve 11 with respect to the tubular body 21 is prevented.

In this configuration, the sleeve 11 can turn inside the tubular cylindrical body 21, and due to a particular fitting, it is not possible to withdraw the sleeve 11 from the body 21 without breaking the latter.

A rounded, wedge-shaped member 23 having streamlined profile is connected to the upper section of the cylindrical tubular body 21, merging therewith. The wedge-shape member 23 extends along a direction substantially inclined with reference to the cylindrical body longitudinal axis, and convergent therewith in the direction of the rear end 213 of the cylindrical tubular body 21.

The flexible sheath F is set over the wedge-shaped member 23 while moving it the in the direction W, indicated in FIG. 5, so as to open the edges 31a and 31b of the elements 3 and increase the cross section of the channel 5 until an aperture is made therein, in the region of the rear end 213 of the tubular body 21.

The profile of the wedge-shaped member 23 allows to elastically deform, by deflection, the elements 3 of the sheath F, opening their terminal portions 31a and 31b.

When the edges 31a and 31b of the elements 3 go beyond the rear end 213 of the cylindrical body 21, they overlap one another thus resuming their regular configuration.

The above mentioned first head 112 of the sleeve 11 has two diametrical wings 114, which facilitate handling of the device during the inserting the wires or cables in the flexible sheath.

In particular, this pair of diametrical wings 114 allow the operator an easy grip on the device D and practical handling or rotation of the sleeve 11 with respect to the tubular cylindrical body 21 without excessive efforts.

The above mentioned first head 112 has a groove 115, made along a relative circumference arc on its back and delimited by two abutments, first 115a and second 115b, respectively.

This groove 115 has a tooth 116 supported by the front end 212 of the cylindrical tubular body 21.

Due to the rotation of the sleeve 11 with respect to the cylindrical tubular body 21, the groove 115 slides with respect to the tooth 116 until this tooth stops against one of the two abutments, first 115a or second 115b.

In particular, when the tooth 116 stops against the first abutment 115a, the device is in its first working position H1, shown in FIGS. 2a and 3a, in which the split 111 of the sleeve 11 is aligned with the split 211 of the cylindrical tubular body 21.

In this configuration, an extremity of the bundle of wires or cables C can be inserted in the device D.

In particular, when the tooth 116 stops against the second abutment 115b, the device is in its second working position H2, shown in FIGS. 2b, 3b and 5, in which the split 211 of the cylindrical tubular body 21 is closed by the sleeve 11.

In this configuration, the extremity of the bundle of wires or cables C is blocked inside the device D. The device D passes from the first working position H1 to the second working position H2 (FIGS. 2a and 2b) due to the counter-clockwise rotation of the sleeve 11 with respect to the cylindrical tubular body 21 performed by the operator, who acts on the pair of diametrical wings 114.

The sequence of working steps of the device for inserting wires or cables in tubular flexible sheath will be now described.

After having grouped and arranged the wires or cables one beside another, the operator sets the device D in the working position H1 by acting on the diametrical wings 114, so as to rotate the sleeve 11 with respect to the cylindrical tubular body 21, until the first abutment 115a stops against the tooth 116.

In this configuration, the split 111 of the sleeve 11 is aligned with the split 211 of the cylindrical tubular body 21.

Then, the operator inserts one end of the bundle of wires or cables C inside the cylindrical tubular body 21 through these splits 111 and 211.

Afterwards, the operator acts on the diametrical wings 114, so as to rotate the sleeve 11, until the second abutment 115b stops against the tooth 116, thus defining the second working position H2.

In this configuration, the end of the bundle of wires or cables C is closed inside the device D, in particular inside the cylindrical tubular body 21.

At this point, the operator, keeping the device D by the diametrical wings 114, set one end of the flexible sheath F on and around the wedge-shaped member 23 and makes the sheath slide in direction W.

While sliding along the wedge-shaped member 23, the elements 3 of the sheath are opened due to elastic deformation, thus defining a lower aperture in the channel 5, through which the cables C enter the sheath F after reaching the rear end 213 of the tubular body 21.

When the elements 3 reach a position beyond the rear end 213 of the cylindrical body 21, they close, thus closing the cables C thereinside.

This way, the operator inserts the group of cables C in the sheath by making this sheath slide along and around the wedge-shaped member 23.

According to another interesting embodiment of the invention shown in FIGS. 10, 10a and 10b, a first head 112a of a sleeve 11 has bigger longitudinal extension, which makes the device's handling still easier and anatomic.

Advantageously, due to this conformation of the first head 112a of the sleeve 11, the operator's fingers can completely encircle this head thus facilitating a best gripping of the wings 114 and, at the same time, facilitating the sheath sliding with respect to the device.

According to this particular embodiment, the head 112a has no split, and the front end 212 of the cylindrical tubular body 21 has no tooth.

The device D passes from the first working position H1 shown in FIG. 10a, in which the split 111 of the sleeve 11 is aligned with the split 211 of the cylindrical tubular body 21, to the second working position H2 shown in FIG. 10b, in which the split 211 is closed by the sleeve 11, due to a simple rotation of this sleeve 11, in clockwise or counter-clockwise direction, by 180°.

Figure 11A:
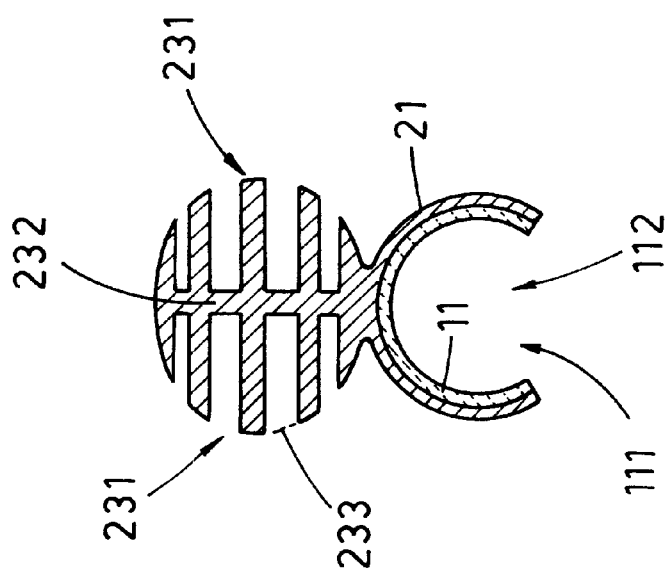
FIG. 11a is a schematic section view taken along line XI—XI of FIG. 11.
Figure 11:
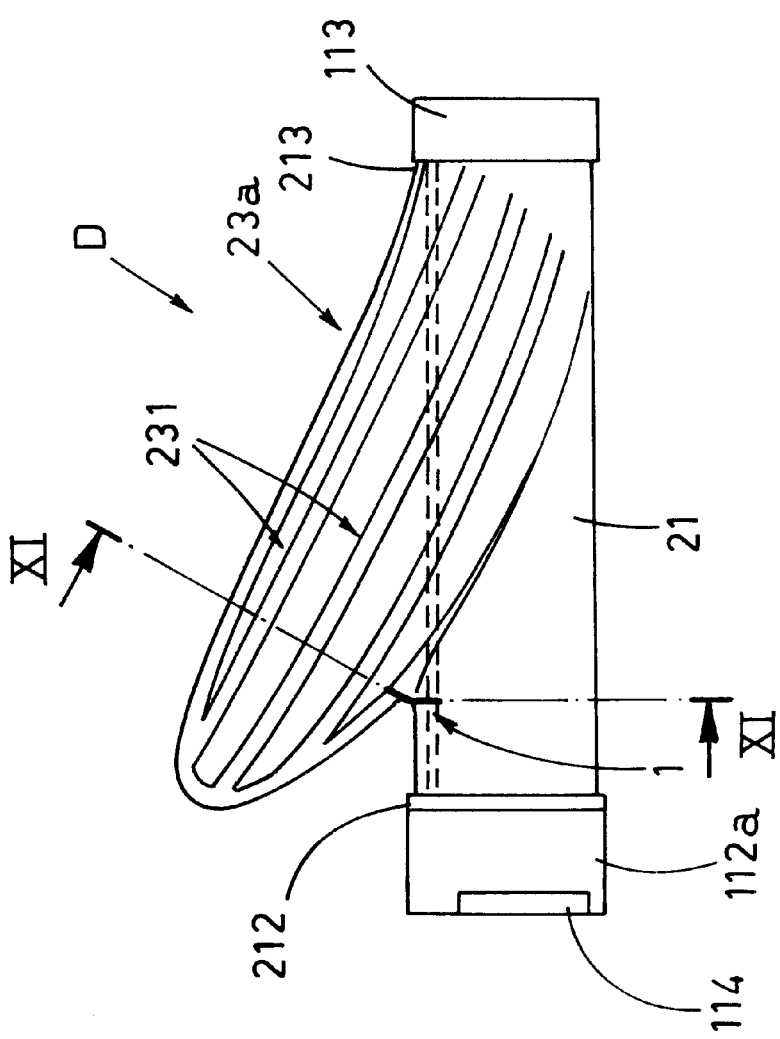
FIG. 11 is a schematic front view of another interesting embodiment.

According to another interesting embodiment, shown in FIGS. 11 and 11a, a wedge-shaped member 23a formed by a plurality of wings 231 rises outside and over the cylindrical tubular body 21.

The wings 231 extend downwards in a substantially inclined direction, convergent toward the rear end 213 of this cylindrical tubular body 21.

These wings 231, supported by a ridge 232, define a rounded envelope 233 which defines the flexible sheath F sliding path during the working steps relative to the inserting of wires or cables therein.

Also in this case, the profile of the wings 231 allows to elastically deform, by deflection, the elements 3 of the sheath F, opening their edges 31a and 31b.

All the described embodiments of the proposed device allow advantageously to insert a bundle of wires or cables in a tubular flexible sheath by simple and immediate operations.

Moreover, it is to be pointed out that according to all the described embodiments, the proposed device is equipped with two elements which define an extremely compact and strong structure guaranteeing high functionality during all the working steps through which the wires or cables are inserted in the flexible sheath.

Therefore, the proposed device allows a group of wires, cables or leads present in the automatic machines control units, in the electric and electronic equipment for motor vehicles, or cables used for computers power supply, or for data transmission lines, compressed air or cooling liquid pipes, or conductors of the telephone lines, to be inserted in a protecting structure without a previous taping.

It is also to be pointed out that the proposed device, in all its embodiments, allows to insert wires, cables, leads and/or pipes in a protective structure also when they are already installed, wired or bundled.

Further, it is to be noted that the proposed device, in all its embodiments, is obtained by a simple and extremely reliable technical solution, using simple components, which results in reducing the production cost.

What is claimed is:

1. A device for inserting wires, cables, pipes in a flexible sheath (F), said flexible sheath (F) including:

a plurality of elements (3), with a slit (3a) made on said elements (3) and with said elements having two edges (31a, 31b) overlapping once another in normal condition, so as to define a channel (5);

a cylindrical tubular body (21) having a front end (212), a rear end (213), an upper part and lower part with a longitudinally extending split (211);

a rounded, wedge-shaped member (23);

said device (D) being characterised in that:

said rounded, wedge-shaped member (23) merges with said upper part of said cylindrical tubular body (21) and extending in a substantially inclined direction, with reference to the longitudinal axis of said cylindrical tubular body (21) and convergent toward said rear end (213);

a sleeve (11), having circular cross section corresponding to the cross section of said cylindrical tubular body (21), is fitted inside the cylindrical body, said sleeve being delimited by two heads, a first head (112,112a) and a second head (113) respectively, of the sleeve (11) having a longitudinal extension such that said first head (112,112a) and second said head (113) respectively go in abutment on inner part of enlarged borders made at a front end (212) and at a rear end (213) of said cylindrical tubular body (21), so as to prevent any longitudinal translation of said sleeve (11) with respect to said cylindrical tubular body (21), with a longitudinally extending split (111) made in the sleeve (11), having dimensions equal to the split (211) of the cylindrical tubular body (21), so that the sleeve (11) is rotatable inside the cylindrical tubular body (21) between two working positions, a first position (H1), in which the split (111) of the sleeve (11) matches with the split (211) of the tubular body (21), so that one end of a bundle of wires or cables (C) is insertable in the device, and second position (H2), in which the split (211) of the tubular body (21) is closed by the sleeve (11), such that said wedge-shaped member (23, 23a) is adapted to cause said tubular flexible sheath (F) to slide around and along said member in a longitudinal direction (W), the profile of said member being adapted to deform, by deflection, the elements (3) of the sheath (F) by opening their edges (31a,31b) for introducing said bundle of wires or cables (C) into said tubular flexible sheath (F) through the said end (213) of said cylindrical tubular body (21).

2. A device according to claim 1, wherein said wedge-shaped member (23) has a streamlined rounded profile, which defines a sliding path for said flexible sheath (F).

3. A device according to claim 1, wherein said wedge-shaped member (23) has a plurality of wings (231), supported by a ridge (232), and extending downwards in a substantially inclined direction, convergent toward said rear end (213) and defining a rounded envelope (233) which defines a sliding path for the flexible sheath (F).

4. A device according to claim 1, wherein said first head (112) of the sleeve (11) has two diametrically opposed wings (114), which are adapted to be gripped and moved, so as to define said two, working positions (H1,H2) and to support the device (D) while said wedge-shaped member (23, 23a) is adapted to cause said tubular flexible sheath (F) to slide around and along said member in a longitudinal direction (w), with said first head (112) having a peripheral groove (115) delimited by a first abutment (115a) and a second abutment (115b), said peripheral groove (115) cooperating with a tooth (116) supported by said first end (212) of said cylindrical tubular body (21); with said groove (115) sliding with respect to the tooth 116, due to the rotation of the sleeve (11) with respect to the cylindrical tubular body (21), until said tooth (116) stops against either the first abutment (115a) for defining said first working position (H1) or the second abutment (115b) for defining said second working position (H2).

5. A device according to claim 1, wherein said first head (112) of said sleeve (11) has two diametrically opposed wings (114) and a radial extension such to facilitates anatomic gripping thereof, so as to support the device (D) while said wedge-shaped member (23, 23a) is adapted to cause said tubular flexible sheath (F) to slide around and along said member in a longitudinal direction (W), said pair of wings (114) being adapted to be gripped and rotated by 180°, clockwise or counter-clockwise, so as to pass from said first working position (H1) to said second working position (H2).

* * * * *